(No Model.)  5 Sheets—Sheet 1.
O. JOHNSON.
APPARATUS FOR ELEVATING, TRANSPORTING, AND DISCHARGING COAL.
No. 559,852. Patented May 12, 1896.
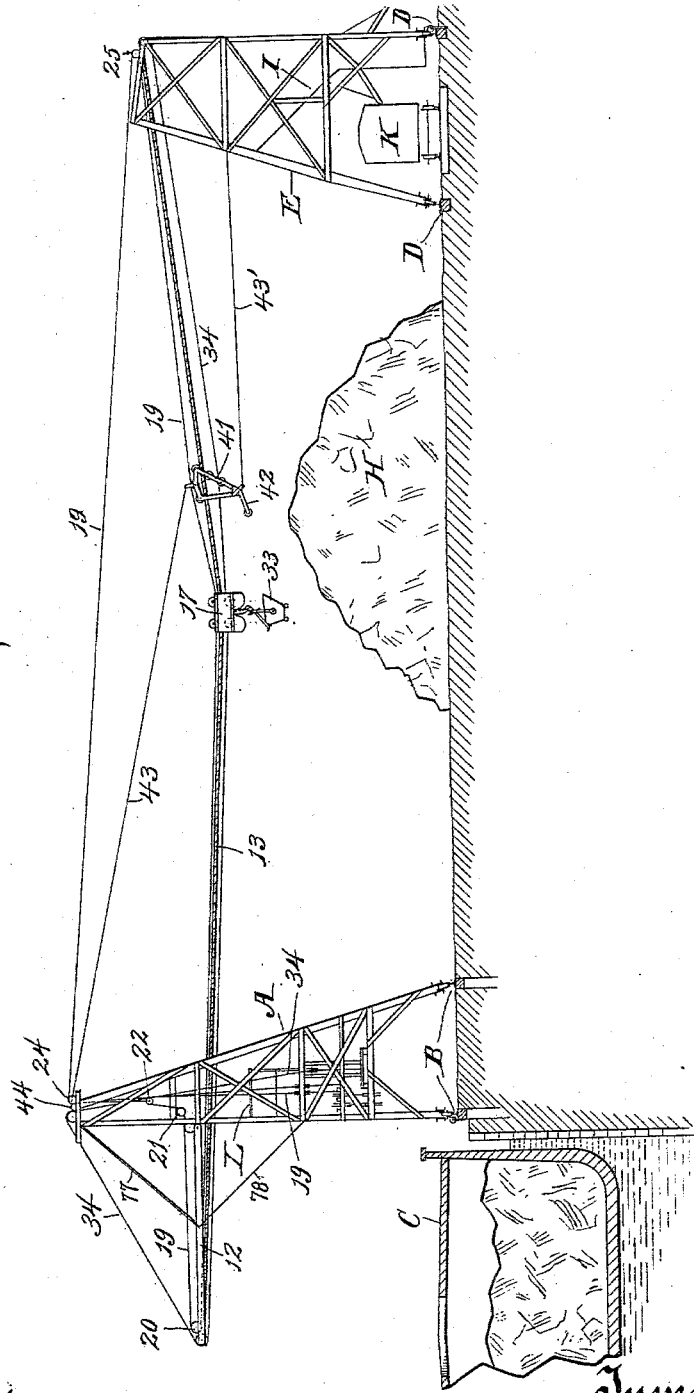

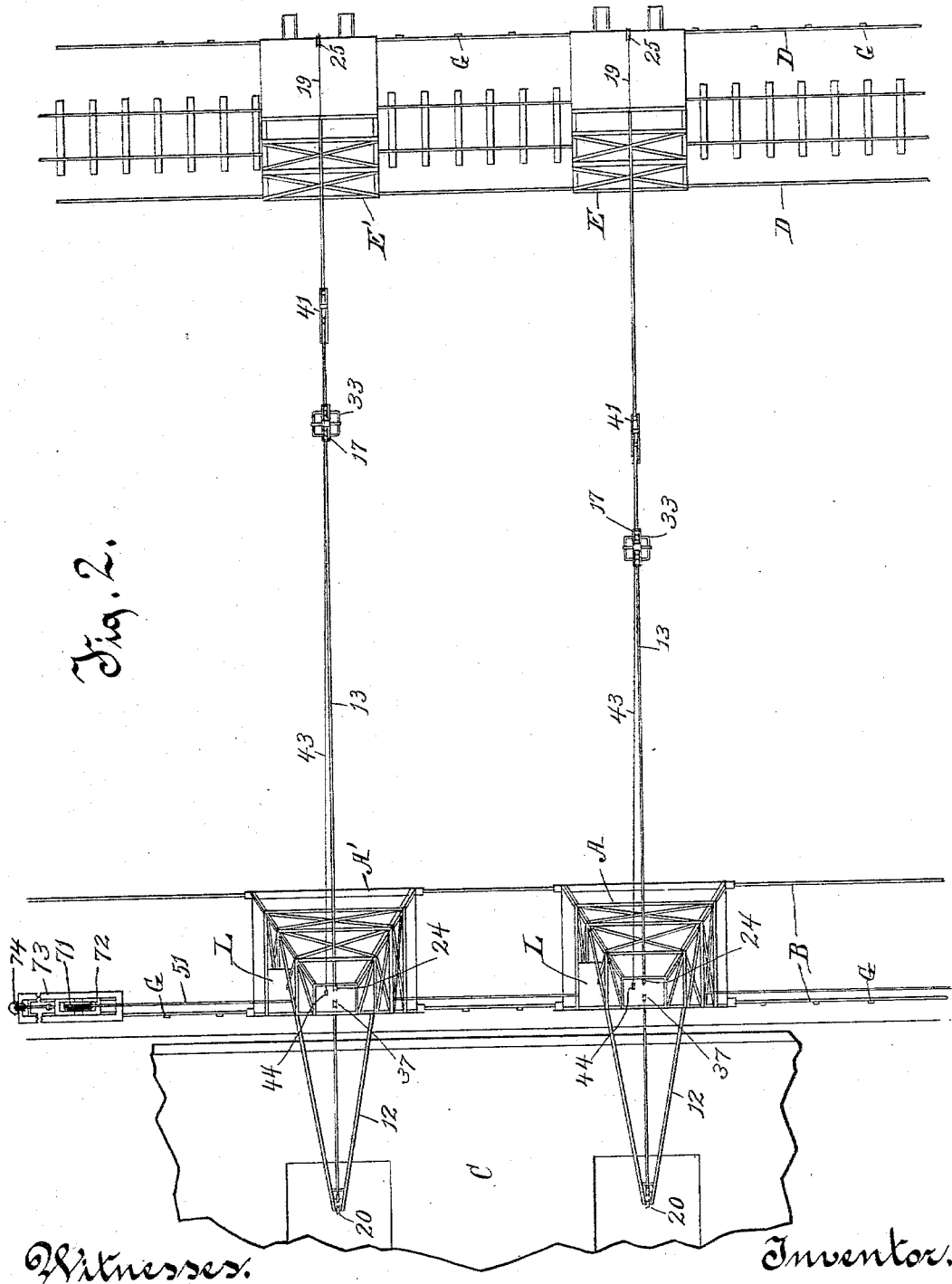

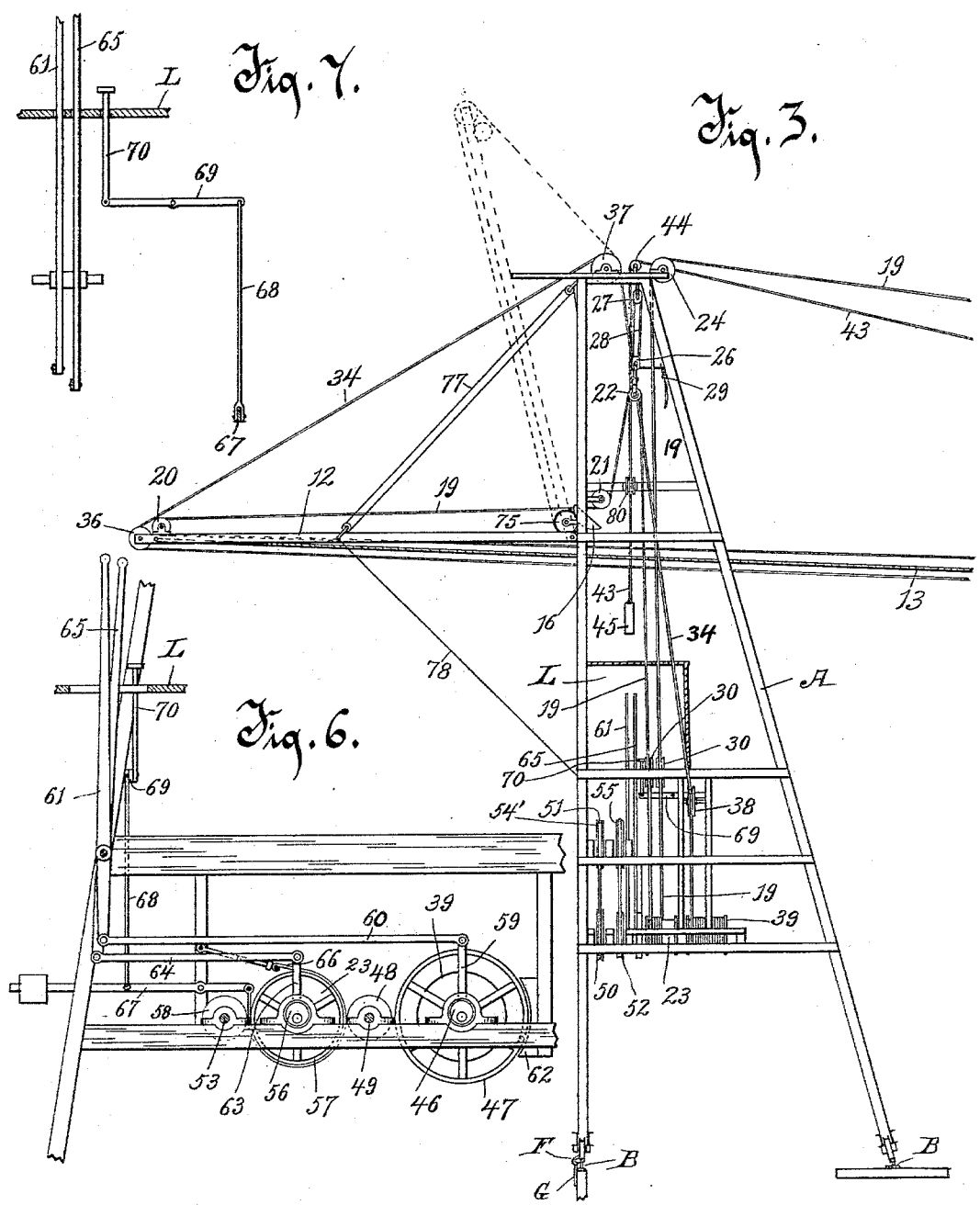

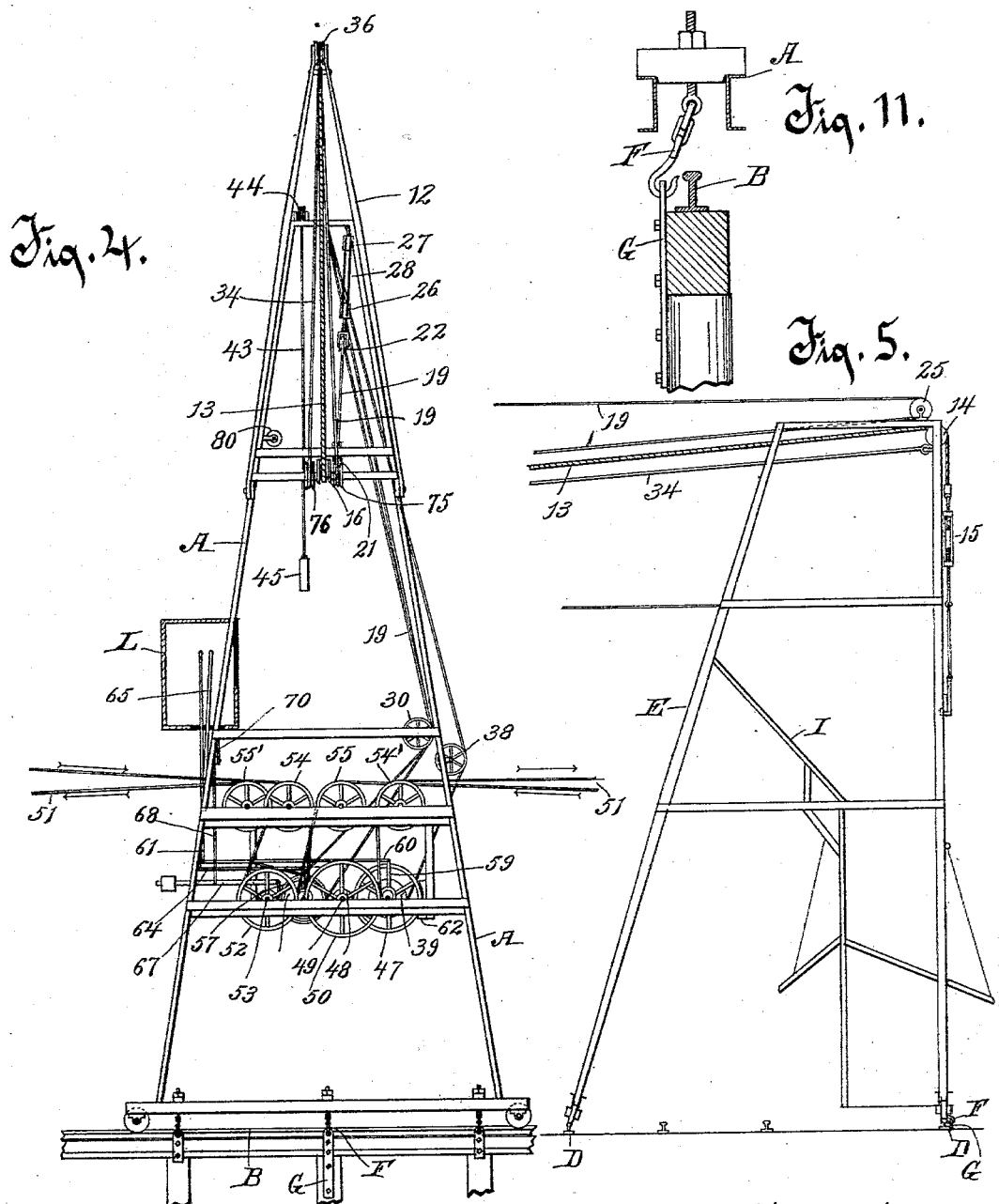

(No Model.) 5 Sheets—Sheet 5.
O. JOHNSON.
APPARATUS FOR ELEVATING, TRANSPORTING, AND DISCHARGING COAL.
No. 559,852. Patented May 12, 1896.
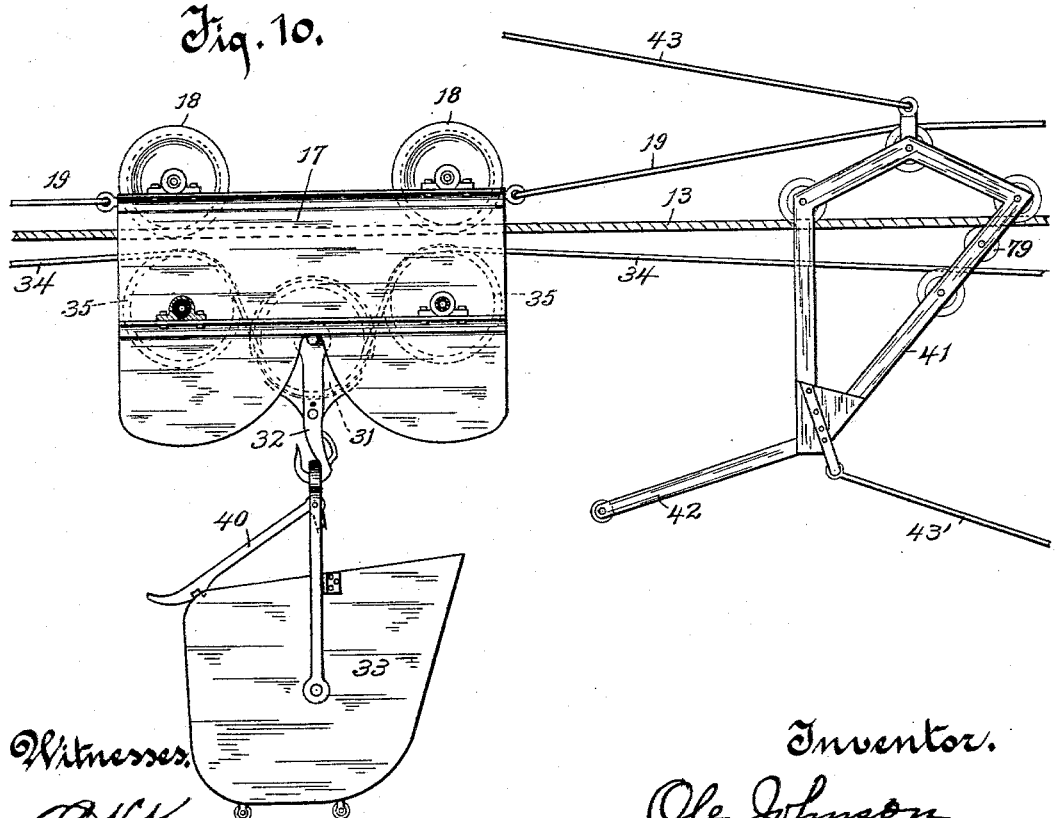

UNITED STATES PATENT OFFICE.

OLE JOHNSON, OF MILWAUKEE, WISCONSIN.

APPARATUS FOR ELEVATING, TRANSPORTING, AND DISCHARGING COAL.

SPECIFICATION forming part of Letters Patent No. 559,852, dated May 12, 1896.

Application filed August 24, 1895. Serial No. 560,387. (No model.)

*To all whom it may concern:*

Be it known that I, OLE JOHNSON, of Milwaukee, in the county of Milwaukee and State of Wisconsin, have invented a new and useful Improvement in Apparatus for Elevating, Transporting, and Discharging Coal and Similar Products or Articles, of which the following is a description, reference being had to the accompanying drawings, which are a part of this specification.

My invention relates to an apparatus, including mechanism therewith, that is especially adapted for discharging vessels of their cargoes, the apparatus being adapted to lift material from the hold of a vessel and to transport it a less or greater distance and discharge it into a receptacle or at a locality desired. The apparatus is arranged to be located on a suitable support, preferably on a track or tracks, adjacent to the vessel to be unloaded, and to be movable or adjustable from place to place alongside the vessel or vessels at a wharf, so as conveniently to operate in or with reference to the vessel. The apparatus is peculiarly well adapted for unloading coal from a vessel, and the drawings illustrate an apparatus embodying my invention, which apparatus is shown in connection with appliances for handling coal. Grain or other material, either in bulk or in packages, can also be readily handled by it.

The object of the invention is to provide a more convenient, reliable, and satisfactory apparatus having greater capabilities for its purpose than has heretofore been known.

The invention consists of the apparatus, its parts, and combinations of parts, as hereinafter described and claimed, or their equivalents.

In the drawings, Figure 1 is a side elevation of my improved apparatus, shown as standing on a wharf with a vessel (a fragment of which is shown in section) alongside. Fig. 2 is a top plan view of my improved apparatus with a fragment of a vessel in outline alongside. Fig. 3 is a side elevation, on an enlarged scale, of one of the front towers and related devices of my improved apparatus. Fig. 4 is an end elevation of one of the front towers of my apparatus. Fig. 5 is a side elevation of one of the rear towers of my apparatus. Fig. 6 is an enlarged view of a portion of the mechanism shown in Fig. 4. Fig. 7 is a view of some of the devices in Fig. 6, the view being at a right angle to the view in Fig. 6. Fig. 8 is a top plan view of operative mechanism, shown on smaller scale and in connection with other parts of the apparatus in Figs. 3 and 4. Fig. 9 is a top plan view of other mechanism, also shown in Figs. 3 and 4, and located therein and in the apparatus somewhat above the mechanism shown in Fig. 8. Fig. 10 is an enlarged view of the carrier on its supporting-cable in connection with a bucket-releasing device. Fig. 11 is a detail of a device for anchoring a tower in place.

In a general way the apparatus consists of one or more front towers and of a corresponding rear tower or towers located at a distance therefrom, the front tower or towers being each provided with an uptiltable boom and a cable stretched from the extremity of the boom to the rear tower, on which cable a material-transporting carrier travels, in connection with which devices there are appliances for uptilting the boom, for elevating and lowering a bucket suspended from the carrier, for drawing or shifting the carrier on the cable, for releasing the bucket and permitting it to tilt and discharge its contents, and other incidental devices, the whole being constructed, mounted, arranged, and adapted by methods and devices hereinafter to be described for coöperation and reliable and convenient use, as may be learned and understood from the drawings and description herein. A single set of devices in the apparatus consists of one front and its complementary rear tower and the cable stretched from one to the other, with the directly-related devices operating thereon and therewith, and a second set of similar devices are also shown in Fig. 2, which are connected in the apparatus operatively by means hereinafter described, and these sets of devices in the apparatus or system of devices may be duplicated and thereby added to the apparatus to such extent as is deemed desirable.

The front towers A A' are preferably mounted on a track B, running near to and parallel with the edge of a wharf at which a vessel C can be tied up for the purpose of unloading it.

At a distance from the track B, and parallel therewith, there is another track D, on which complementary rear towers E E' are mounted and can travel. These towers can be anchored or secured in place against travel on their tracks by any convenient means, but are preferably secured in place by a hinged hook F, Fig. 11, secured to the foot of the tower and arranged to take into an eyeplate G, fixed on the track-timber. A number of these eyeplates may be provided, located at such points along the track as shall be required for anchoring the towers at such localities as are desired. These towers being released from the eyeplates can be moved along on their tracks by means of teams or other pulling or pushing power applied directly thereto.

On each of the front towers A A' a boom 12 is mounted, being so hinged to the tower as normally to project therefrom forwardly in a substantially horizontal direction and to be tiltable upwardly from that position to and against the upper portion of the tower. A cable 13 is secured at one end to the boom, near its free extremity, and at its other end is secured to the complementary rear tower E, being preferably run over an idle-pulley 14 and secured to one end of a turnbuckle 15, the other end of which turnbuckle is secured to the tower E. By means of this turnbuckle the tension of the cable can be adjusted and any undesirable slack therein can be taken up. The boom 12, as will be seen by reference to Figs. 2 and 4, is furcate in form and the cable 13 is stretched longitudinally thereof and medially of the legs or furcate parts of the boom, and a saddle 16 is so disposed and fixed on the tower at or adjacent to the pivot of the boom as to receive the bearing thereon of the cable 13 when the boom is uptilted.

A carrier 17 is provided with two grooved pulleys 18 18, by means of which it is adapted to and does travel back and forth on the cable 13. A shifting-rope 19 is secured to the front end of the carrier 17 and runs thence to and about an idle-pulley 20, mounted on the boom 12 near its free extremity, and thence about an idle-pulley 21, fixed on the frame, thence over a tightening-pulley 22, mounted in an adjustable pulley-block, thence by a plurality of turns around a winch or drum 23, thence over an idle-pulley 24, mounted in the top of the front tower, and thence about a pulley 25 and back to the carrier, to which its other extremity is secured. This construction secures the carrier to a practically endless shifting-rope, which being wound on a revoluble drum 23, provides a means for compelling the carrier to travel forward and back on the cable 13. For adjusting the tightening-pulley 22 the block of this pulley is suspended from a running pulley-block 26, and this pulley-block 26 is in turn suspended from a standing pulley-block 27, which is suspended on the tower, and a tightening-rope or fall 28, secured to the block 26, runs about pulleys in the block 27 and about other pulleys in block 26, and thence to a cleat 29, fixed on the tower, to which the rope is releasably secured. The shifting-rope 19 runs on idle-pulleys 30, mounted on the tower a little above the drum 23, whereby the run of the rope is diverted into a direction suitable for winding on the drum and running on the pulleys in the top of the tower and with reference to avoiding contact with other mechanism.

In connection with the carrier 17 a tackle is provided for elevating and supporting the material while being transported, which tackle includes a sheave 31, and in those cases where the material is to be elevated and transported in a bucket it preferably also includes a hook 32, depending from the sheave. This hook is adapted to take into the bail of a bucket 33, into which the material is put for elevating and transporting it. A draft-rope 34, fastened at one extremity to the rear tower, runs over pulleys 35 35 in the carrier 17, and between the pulleys 35 it runs under and supports the sheave 31 and its load. Thence the draft-rope runs to and around a pulley 36, mounted in the outer end of the boom 12, thence over a pulley 37 in the top of the tower, thence over the guide-pulley 38, and thence to the winch 39, to which its other extremity is secured and about which it is wound.

The bucket 33, which is an illustration of a class of buckets or cages for containing the material to be elevated and transported, is so hinged and mounted on its bail that by gravity it turns over bottom upward, but when in use for receiving and carrying material it is turned upright and is secured releasably in upright position by a latch 40, hinged on the bail and provided with a catch adapted to hold the bucket in upright position. By means of this bucket the cargo or load of a vessel, especially if of coal, iron ore, wheat, corn, or other material in bulk, can be taken up from the vessel and transported along the line of the cable 13, either to the rear tower E or to such point as it is desired to deposit the material, as at some medial locality where it can be deposited on a heap, as shown at H in Fig. 1. For releasing the latch 40 and permitting the bucket to tip over and dump its load a latch-releasing device 41 is provided, which consists of a frame provided with pulleys adapted to travel on the cable 13 and having a laterally-projecting arm 42, preferably provided with an antifriction-wheel in its extremity, which arm is adapted to impinge against the latch 40 when the carrier comes to the latch-releasing device and lift the latch, releasing the bucket and permitting it to tip over by gravity and dump its contents. The latch-releaser 41 is provided with shifting-ropes 43 43'. The rope 43 is attached to the upper portion of the frame of the latch-releaser and runs thence over a pulley 44 in the top of the front tower and is provided with a weight 45, which is adapted to draw the latch-releaser toward and hold it yieldingly near to the front tower. The other shifting-rope, 43', which is more properly a stay-rope, is attached to the lower end of the frame of the latch-releaser and runs to and is secured releasably on the rear tower to hold the releaser in position against the pull of the shifting-rope 43. The rope 43' may be used to haul the latch-releaser toward the rear tower; but ordinarily the releaser is moved in that direction by running the carrier against it and pushing it along on the cable. The releaser is provided with idle-pulleys on which the shifting-rope 19 and the draft-rope 34 run. When desired, the latch-releaser 41 can be moved to the extreme end of the cable in the rear tower, and when so located the carrier 17 can be run to that distant point, so that the bucket, when it overturns, will discharge its load into a chute I, which chute discharges into a bin or into a car K, as desired.

For operating the hereinbefore-described mechanism in each of the sets of devices forming the system of my apparatus by and through the drum 23 and the winch 39 in each set of devices mechanism is provided as follows: The journal of the winch 39 is mounted at one end in an eccentric-block 46, and has a sufficient amount of tiltable play in its bearing at the other end to permit it to be shifted by means of the eccentric sufficiently that a friction-wheel 47 thereon can be readily put into contact with a friction-wheel 48 on the driven shaft 49. The shaft 49 is provided with a belt-wheel 50, about which a driven belt 51 runs, which belt 51 runs in one direction to a suitable source of power, and in the other direction runs to a corresponding driven shaft in the tower of the next adjacent set of devices, and thence to and about a tightening-pulley 71, (see Fig. 2,) and thence in the opposite direction about the wheel 52 on driven shaft 53. This belt 51 is carried over idle-wheels 54 54' and 55 55' in running to and from the wheels 50 and 52, respectively, the idle-weels 54 54' and 55 55' being located near together and at a little distance from the wheels 50 and 52, respectively, so as to so guide the belt 51 as to cause it to bear against the surface of the wheels 50 52, respectively, for a considerable portion of their surfaces to increase the bearing-surface and friction between them. The tightening-pulley 71 is mounted in a frame 72, that slides in ways therefor in a fixed frame 73, and a weight 74 is attached to the distant end of the frame 72 by a cord that runs over a pulley in the fixed frame. This device is adapted to hold the belt 51 yieldingly taut. This device is of course located at the extremity of the run of the belt 51, whether it runs through one, two, or more sets of elevating transporting devices. The journal of the drum 23 is at one end pivoted in the eccentric-block 56, and at the other end has its bearing loosely and so as to be slightly tiltable in a suitable journal-box therefor. The journal of the drum 23 is provided with a friction-wheel 57, adapted by means of the eccentric 56 to be put into frictional contact with the wheel 58 on the shaft 53 or with the wheel 48 on the shaft 49. When the apparatus is being used, the belt 51 and the shafts 49 and 53 are constantly running. The eccentric 46 is provided with a crank-arm 59, and a rod 60 connects it to the lever-handle 61, pivoted medially on the tower. By means of this lever-handle 61 the eccentric 46 can be so tilted as to throw the friction-wheel 47 into engagement with the wheel 48 on the shaft 49, whereby the draft-rope 34 is wound up or against the fixed brake-block 62, whereby it is held against rotation. The eccentric 56 is provided with a crank-arm 63, connected by a rod 64 to the lever-handle 65, pivoted medially on the tower. This construction provides for shifting the wheel 57 into contact with the wheel 58, or with the wheel 48, as desired. A flexible brake-band 66, secured at one end to the tower, passes around and bears against the rim of a wheel on the journal of the drum 23, and at its other extremity is connected to the arm of a weighted lever 67, which weighted lever is adapted automatically to put the brake-band into action, so that normally the drum 23 is held against rotation. To lift this weighted lever and thereby release the brake-band, a rod 68 connects it to a medially-pivoted lever 69, provided with a pedal-rod 70, which extends up through the floor of the cab or attendant's house L. The lever-handles 61 and 65 also extend into this house and are adjacent to the pedal 70.

It must be understood that in use the carrier 17 is run out to the extremity of the boom 12 or to the place at which the load is to be obtained, and that the winch 39 being released the weight of the bucket 33 carries it and the tackle (of sheave 31) down into the hold of the ship or to the place of receiving the load; that when the bucket is filled the friction-pulley 47, by means of the handle 61, is put into frictional contact with the wheel 48, and that thereby the draft-rope 34 is wound on the winch 39, and the bucket is thereby elevated to the carrier; that thereupon the handle 61 is shifted, throwing the wheel 47 out of contact with the wheel 48 and into engagement with the stationary brake-block 62, by which means the draft-rope is held taut; that thereupon by shifting the lever-handle 65 the friction-wheel 57 is put into engagement with the wheel 58 on shaft 53, and the drum 23 is so rotated, as by the winding of the shifting-rope 19 thereon, to shift the carrier 17 toward the right on the cable 13 until it comes to the latch-releasing arm 42, when the attendant shifts the lever 65, putting the wheel 57 out of contact with the wheel 58, and at the same moment releasing the pedal 70, (which has been pressed down by his foot during the running of the wheel 57,) so that the brake 66 holds the drum 23 against rotation, thus retaining the carrier temporarily in position while the load is being discharged from the bucket 33. As soon as the load is discharged the brake-band 66 is again released, and the lever 65 is shifted so as to put the band-wheel 57 into contact with the wheel 48 on shaft 49, whereby the rotation of the drum 23 is reversed and the carrier is run back to the boom for obtaining another load. It will be understood that as the belt 51 runs to and from a source of supply over wheels 50 and 52 in each of the front towers of the several sets of devices composing the system of my apparatus the shafts 49 and 53 are constantly running and available whenever desired for operating the mechanism in the set of devices immediately connected therewith.

When the boom 12 is to be thrown up from over a vessel and out of the way of its masts into the position shown in dotted lines in Fig. 3, the carrier 17 is run out on the cable 13 between the towers or to the rear tower, and thereupon by winding the draft-rope 34 on the winch 39 in excess of the winding necessary to elevate the bucket 33 up to the carrier 17 the pull on the draft-rope will throw the boom up into the position indicated.

As it may be desirable at some times to throw up the boom when the machine is not in operation I provide a running-tackle by which this can be done by hand. The tackle consists of a sheave attached to the upper part of the tower and a running-sheave attached to the boom, over which sheave a rope or fall 77 runs, the free end of which runs down to the lower part of the tower and is there secured releasably to any sufficient fastening therefor. A stay-rope 78, attached at one end to the boom, is adapted to be secured releasably to the tower at or near the attendant's house L and to hold the boom against undesired uptilting.

Pulleys 75 and 76 are provided at or near the axis of the boom 12, about which the shifting-rope 19 and the draft-rope 34 respectively turn when the boom is uptilted.

A grooved pulley or wheel 79, journaled in the frame 41, bears against and travels on the under side of the cable 13 and holds the releasing device in place and prevents its being uptilted under thrust of the resistance of the latch 40.

If in putting up the apparatus it is anticipated that it will be desired to discharge the bucket farther to the left, Fig. 1, than the point at which the releasing device is shown in that figure, it will be necessary to carry the draft-rope attached to the weight 45 over an idle-pulley 80, mounted on the tower at one side, so as to deflect the draft-rope and carry the weight to one side and out of the path of the carrier and the bucket.

What I claim as my invention is—

1. The combination with a plurality of sets of towers, a carriage-supporting cable stretched on and between the towers of each set, a carrier adapted to travel on each cable, and means for moving the several carriers on their cables, of a belt running from a source of power supply to and on a driven shaft in a tower of each set of towers, and a drum in each tower having such driven shaft, in connection with the means for moving the carrier arranged to be put into action from the driven shaft, substantially as described.

2. The combination with a plurality of sets of towers, a carrier-supporting cable stretched on and between the towers of each set, a carrier for and arranged to travel on each cable, a revoluble drum in a tower of each set of towers, an endless shifting-rope for and secured to each carrier and winding on the corresponding drum, the rope being adapted to move the carrier in opposite directions on the cable, two shafts in one of the towers of each set of towers, an endless belt from a source of power supply running in one direction on one of said shafts in a tower of each set of towers and running in the reverse direction on the other of said shafts in a tower of each set of towers, and means for putting the drum into action by connecting it operatively with one or the other of said shafts in one or more of the drum-supporting towers of each set of towers, substantially as described.

3. The combination with a plurality of sets of towers, a carriage-supporting cable stretched on and between the towers of each set, a carrier adapted to travel on each cable, an endless shifting-rope for and secured to each carrier, and a drum in a tower of each set, on which drum the corresponding shifting-rope winds, of two shafts in a tower of each set of towers adjacent to said drum, a driving-belt from a source of power supply running in one direction on one of said shafts in a tower of each set of towers, and in the reverse direction on the other of said shafts in a tower of each set of towers, and a tightening-pulley over which the belt runs beyond the most distant set of devices actuated thereby to change its direction and preserve its tension, substantially as described.

4. The combination with a plurality of sets of towers, a carrier-supporting cable stretched on and between the towers of each set, a carrier adapted to travel on each cable, an endless shifting-rope secured to each carrier, and a drum in a tower of each set of towers on which drum the corresponding shifting-rope winds, of two shafts in a tower of each set of towers adjacent to said drum, a driving-belt from a source of power supply running in one direction on one of said shafts in a tower of each set of towers and in the other direction on the other of said shafts in a tower of each set of towers, a winch in a tower of each set of towers arranged to be put into operative contact with one of said shafts, a draft-rope in each set of towers secured to the distant tower of the set and passing over pulleys in the carrier and winding on the winch of that set of towers, and a tackle on each draft-rope intermediate of the pulleys in the carrier, substantially as described.

5. The combination with a set of towers, one of which towers is provided with a normally horizontal but uptiltable boom, and a carrier-supporting cable attached to the free extremity of the boom and to the distant tower, of a winch in the boom-provided tower and a draft-rope secured at one extremity to the distant tower and running on a pulley or pulleys in the carrier, in a tackle, in the free extremity of the boom and in the top of the tower and winding on the winch, and means for rotating the winch.

6. The combination with a set of towers and a carrier-supporting cable stretched on and between the towers, of an adjustable latch-releasing device on the cable, said latch-releasing device comprising a frame provided with a laterally-projecting arm, a weight connected to the frame of the releasing device by a shifting-rope attached thereto respectively and running on a pulley on one of the towers the weight being adapted to hold the releasing-frame up to its work, and a stay-rope secured to the frame and detachably to the distant tower, substantially as described.

7. In an apparatus of the character described, the combination with two shafts 49, 53 disposed parallel with and adjacent to each other, and a continuously-running endless belt, running in one direction on one of the shafts and in the reverse direction on the other of said shafts, of an intermediate winding-drum adapted at will to be put into operative engagement with one or the other of said shafts, and an automatic and positively-acting brake adapted normally to hold the drum against revolution, substantially as described.

8. In an apparatus of the character described, the combination with a supporting-frame, two shafts 49, 53 journaled in the frame and disposed parallel with and near to each other, and a continuously-running endless belt, running in one direction on one of said shafts and in the reverse direction on the other shaft, of an intermediate winding-drum journaled at one end in an eccentric-box 56, means for oscillating said box whereby said drum is put into operative engagement with either of said shafts, a winch 39 journaled at one end in an eccentric-box 46, means for oscillating said box, and a brake and a brake-block severally adapted to engage wheels on the drum and on the winch respectively, substantially as described.

9. In an apparatus for elevating and transporting material, a plurality of sets of towers carrying cables, carrier-shifting ropes and draft-ropes; tracks on which the front and rear towers respectively of the several sets of towers are mounted; and an endless belt running on shafts in a tower of each set, so arranged that the towers of a set can be shifted on the tracks toward or from another set or concurrently therewith, substantially as described.

In testimony whereof I affix my signature in presence of two witnesses.

OLE JOHNSON.

Witnesses:
C. T. BENEDICT,
ANNA V. FAUST.